Oct. 3, 1967 J. W. E. HANES 3,345,085
AUTOMATICALLY ALIGNABLE AND CONNECTIBLE TOOL JOINT
Filed Feb. 8, 1965 3 Sheets-Sheet 1
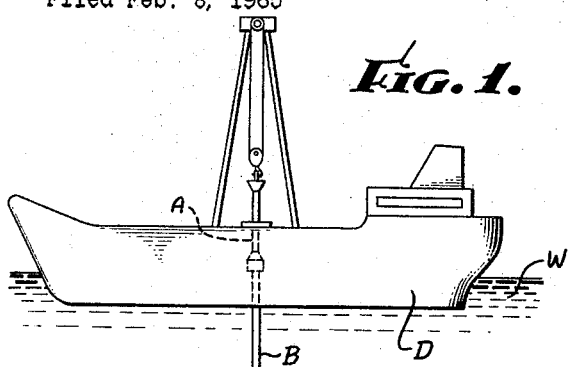
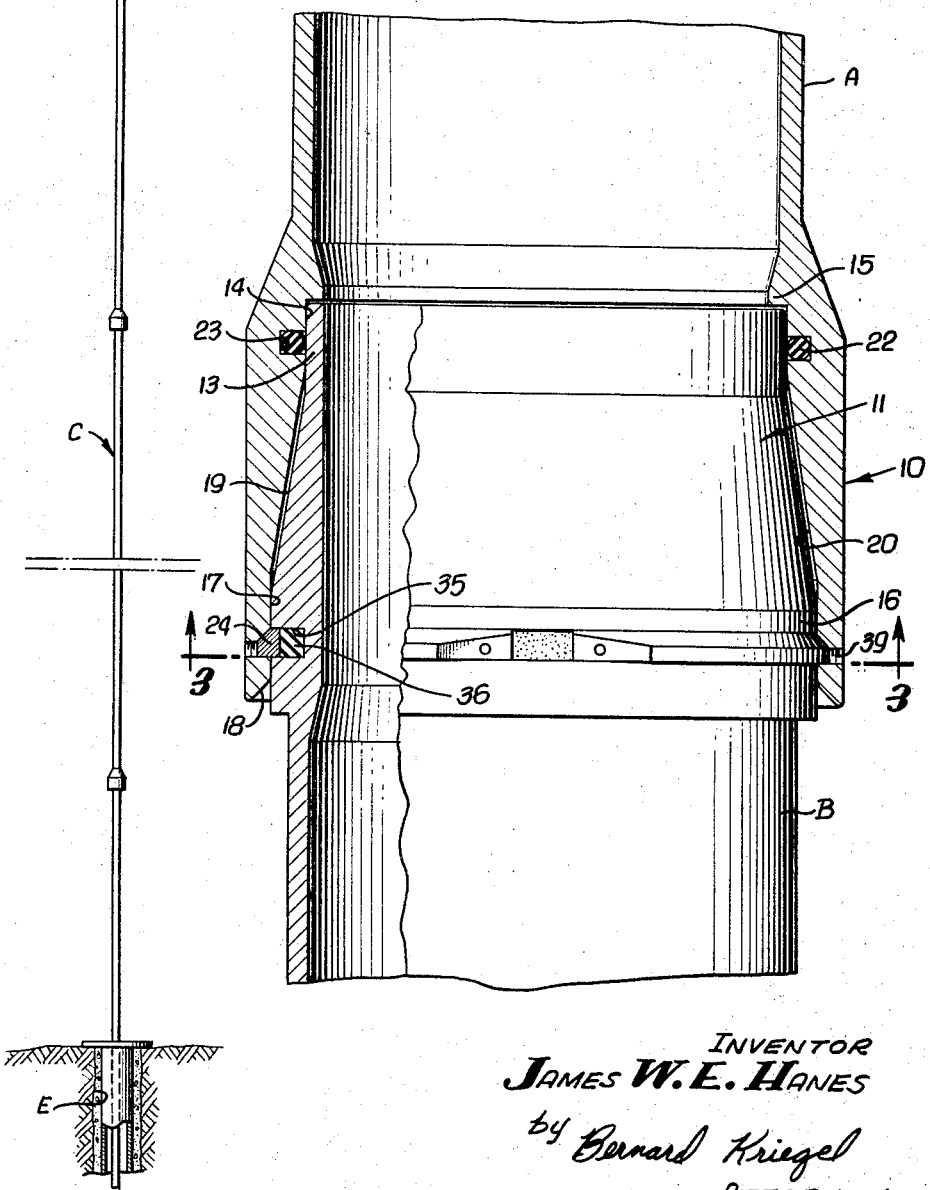
INVENTOR
JAMES W. E. HANES
by Bernard Kriegel
ATTORNEY Oct. 3, 1967                J. W. E. HANES                3,345,085
           AUTOMATICALLY ALIGNABLE AND CONNECTIBLE TOOL JOINT
Filed Feb. 8, 1965                                3 Sheets-Sheet 2
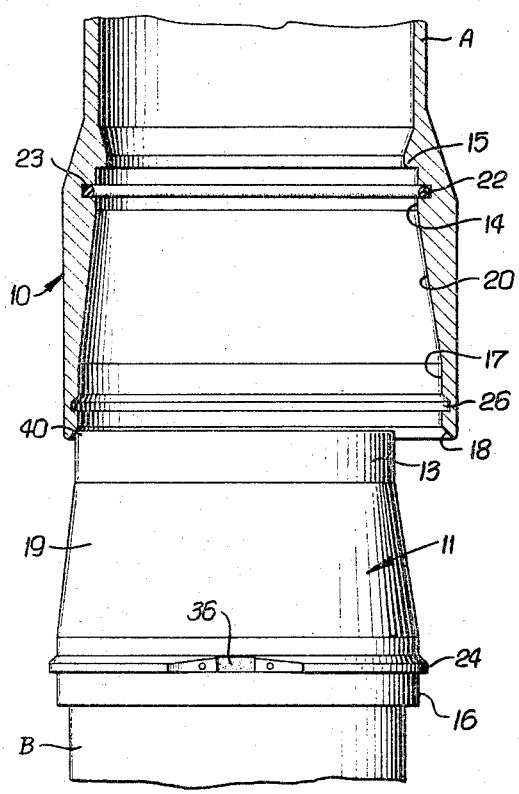
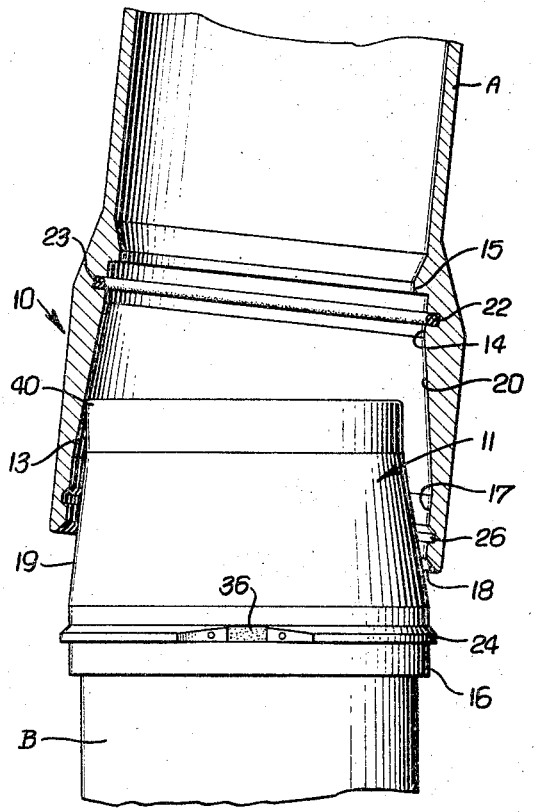
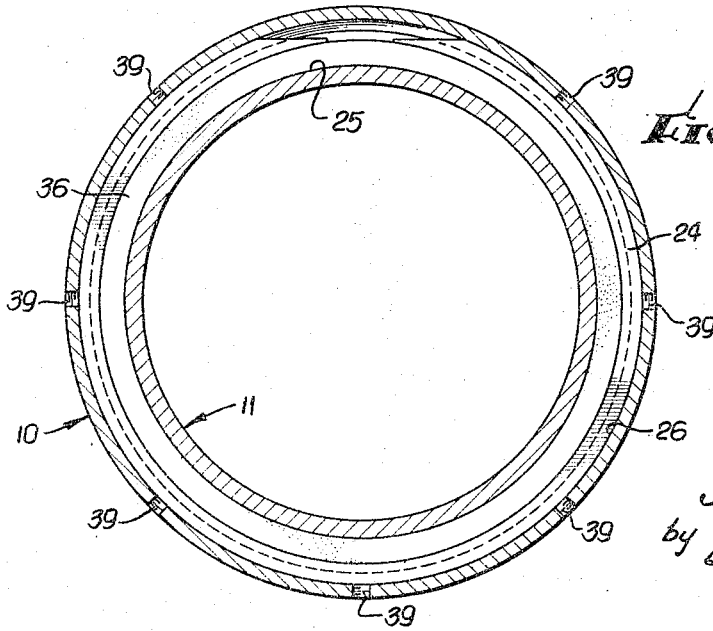
INVENTOR
JAMES W. E. HANES
by Bernard Kriegel
    ATTORNEY

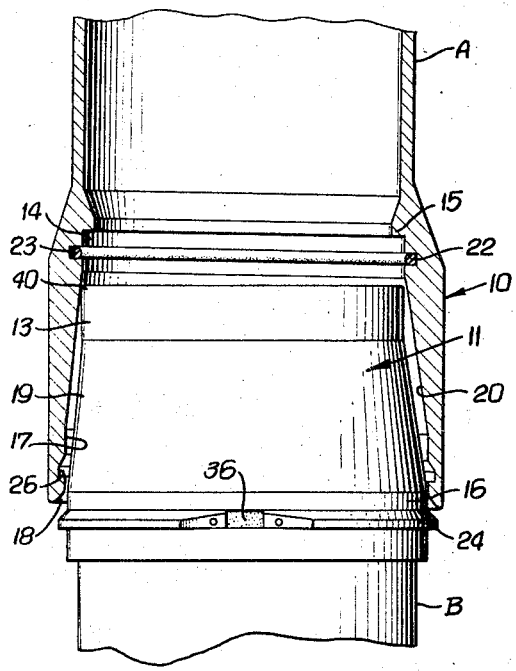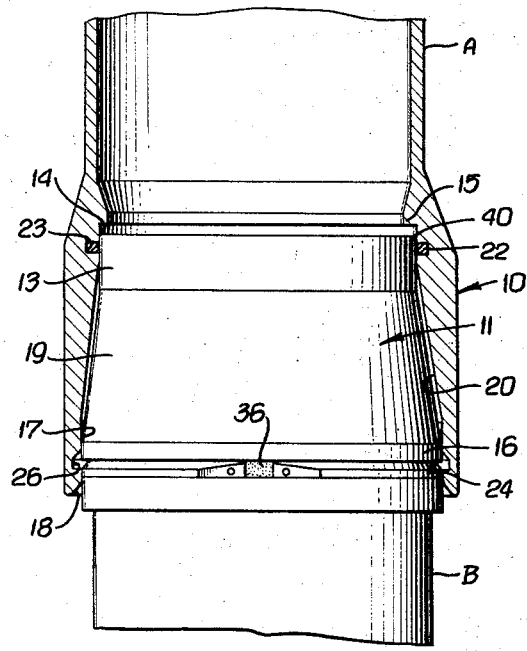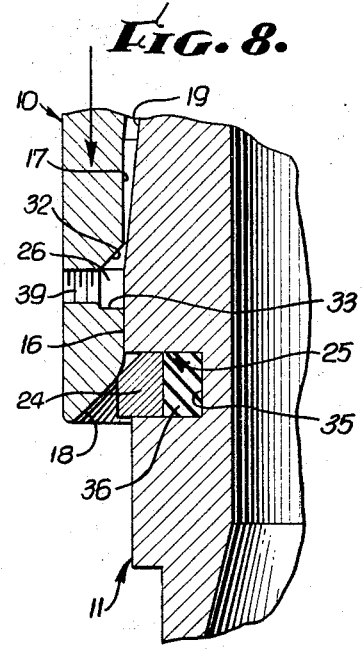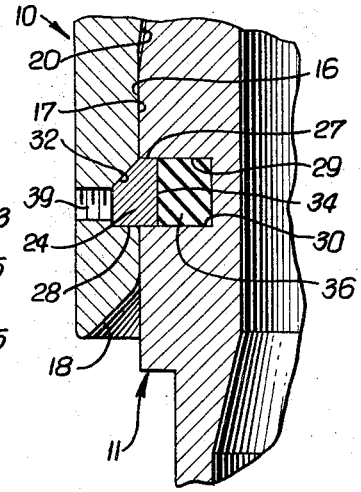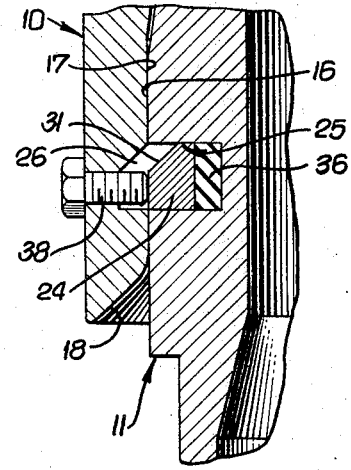

United States Patent Office 3,345,085
Patented Oct. 3, 1967

3,345,085
AUTOMATICALLY ALIGNABLE AND CON-
NECTIBLE TOOL JOINT
James W. E. Hanes, Ventura, Calif., assignor to
Huntsinger Associates, a joint venture
Filed Feb. 8, 1965, Ser. No. 430,911
12 Claims. (Cl. 285—27)

The present invention relates to tool joints for connecting pipe sections together.

Difficulty has been encountered in connecting sections of pipe together as the pipe is lowered from a floating vessel toward and into a subsea well bore. Heretofore, the pipe sections have been secured to one another by either using threaded joints or by welding slip type joints to one another. The pitch and roll of the floating vessel makes the proper stabbing of one of the joint elements into the other and their interconnection difficult, and, at times, almost impossible of accomplishment. As a result, much time is consumed in making up the joints. In view of the high unit cost of operating floating drilling vessels, the total monetary cost of making up the joints becomes prohibitive.

An object of the present invention is to provide a tool joint or connector that enables the element thereof to be easily stabbed one into the other and readily connected to each other despite initial misalignment between the pipe sections which may have been due to the motion of a floating vessel from which the pipe is being run toward and into a subsea well bore.

Another object of the invention is to provide a tool joint or connector that enables a stable, stiff coupling connection to be made easily, merely by stabbing one of the joint elements into its companion element without any relative rotation between the elements being required, insertion or stabbing occurring without difficulty despite initial misalignment between the several parts of the joint. In the event of misalignment, the joint elements automatically effect their appropriate alignment as insertion of one element into its companion element proceeds.

A further object of the invention is to provide a tool joint or connector in which the joint elements can be easily connected to and sealed against one another, and in which the sealing element is protected to prevent its damage during handling of the connector parts.

An additional object of the invention is to provide a tool joint or connector in which the joint elements are locked together by a coupling ring, and in which the coupling ring can be readily released in the event the pin end of the connector is to be removed from its box end.

Yet another object of the invention is to provide a tool joint or connector whose pin and box ends can be locked together through the agency of an expandable and retractable lock ring, the movement of the ring to its appropriate locked position being definitely indicated to an observer.

Still a further object of the invention is to provide a tool joint or connector whose pin and box ends can be locked together through the agency of an expandable and retractable lock ring, in which the lock ring is appropriately centered in the groove of the member carrying it to facilitate its uniform expansion and contraction when being shifted into the opposed groove of the other member of the joint.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a diagrammatic view illustrating a specific application of the invention.

FIG. 2 is an enlarged longitudinal section and side elevation view of a tool joint or connector embodying the invention;

FIG. 3 is a cross-section taken along the line 3—3 on FIG. 2;

FIGS. 4, 5, 6 and 7 illustrate different relative positions of the tool joint parts in effecting their interconnection;

FIG. 8 is an enlarged section through a portion of the tool joint showing the parts moving relatively toward a locked condition;

FIG. 9 is a view similar to FIG. 8, illustrating the parts locked to one another; and FIG. 10 is a view similar to FIG. 9, showing the manner of unlocking the tool joint parts from each other.

In the specific form of the invention illustrated in the drawing it is desired to connect or couple the lower end of one pipe section A to the upper end of an adjacent pipe section B. A specific use of the invention is in marine conductors, in which conductor pipe C is to be lowered from a floating vessel D through a body of water W and into a well bore E. Each pipe section A, B has a lower box portion 10 and an upper pin portion 11, the lower box portion of one pipe section, such as A, being adapted to be disposed over the upper pin portion of a pipe section, such as B, therebelow. The pin and box portions A collectively constitute a tool joint or connector for coupling the pipe sections to one another. The lower box portion 10 has its upper end suitably secured to the pipe or tubular member thereabove, as by being welded thereto. Similarly, the lower end of the upper pin portion 11 of the tool joint is connected, as by welding, to the pipe section there-below, of which it actually forms a part.

The upper portion of the pin 11 has an outer cylindrical surface or section 13 adapted to fit snugly within an inner cylindrical wall or section 14 at the upper portion of the box 10, this cylindrical surface terminating at an upper box shoulder 15. Similarly, the pin 11 has a lower outer cylindrical surface or section 16 of a substantially greater diameter than its upper cylindrical surface 13 adapted to fit within a companion inner cylindrical wall or section 17 at the lower entry portion of the box, the lower end of the outer cylindrical surface 17 merging into an outwardly flaring mouth portion 18 constituting the terminus of the box. The pin 11 has an outer tapered wall or section 19 extending from the upper end of its lower cylindrical surface 16 to the lower end of its upper cylindrical surface 13. This tapering wall or section is adapted to fit within and is companion to an inner tapered wall or section 20 which tapers in an upward direction from the upper end of the lower inner cylindrical surface 17 to the lower end of the upper cylindrical surface 14. The distance between the lower end of the upper outer cylindrical surface 13 of the pin 11 and the upper end of its lower outer surface 16 is substantially the same as the distance between the lower end of the inner cylindrical surface 14 within the upper portion of the box and the upper end of its lower inner cylindrical surface 17, so that when the pin 11 is disposed fully within the box 10 and with the upper end of the pin substantially abutting the box shoulder 15, the upper and lower outer cylindrical surfaces 13, 16 fit snugly within the upper and lower inner cylindrical surfaces 14, 17, respectively. The distance between the upper and lower cylindrical surfaces 13 and 16 and 14 and 17 is sufficient so that a stiff, stable structure is provided capable of resisting substantial bending loads.

When the pin 11 is inserted fully within the box 10 its upper outer cylindrical surface 13 engages an elastic seal ring 22, such as a rubber or rubber-like O-ring, disposed within an internal groove 23 in the upper portion of the box.

The pin 11 and box 10 are locked to one another by a split lock ring 24 that is inherently expandable and which is disposed within a peripheral groove 25 in the lower portion of the pin, this groove extending laterally inwardly from its lower cylindrical surface 16. The lock ring 24 can occupy a contracted position within the groove 25 such that its external diameter is less than the internal diameter of the lower inner cylindrical wall 17 of the box section, and it may be expanded outwardly into a companion internal groove 26 in the lower portion of the box section 10 opening laterally inwardly through its lower cylindrical surface 17. This groove 26 has a lateral depth substantially less than the radial thickness of the lock ring, and may, in fact, have a radial thickness substantially half that of the lock ring, so that when the lock ring is disposed within the internal groove 26 it is also contained substantially within the external groove 25 of the pin member 11.

As disclosed, the lock ring 24 has upper and lower surfaces 27, 28 normal to the axis of the pin and slidable along companion upper 29, 30 and lower walls of its groove 25 in moving laterally therewithin. The upper outer corner of the lock ring is beveled to provide a cam surface 31 tapering in an upward direction and adapted to engage a companion tapered surface 32 constituting the upper side of the inner groove 26 of the box. The lower side 33 of the box groove is normal to the axis of the box, and when the pin 11 is disposed fully within the box 10, as shown in FIG. 2, the lock ring expands partially outwardly of the pin groove 25 and into the box groove 26 to lock or couple the pin and box to one another, with the upper and lower outer cylindrical surfaces 13, 16 of the pin snugly disposed within the upper and lower inner cylindrical surfaces 14, 17 of the box.

When the lock ring 24 is in its locked position within the groove 26 of the box, the inner surface 34 of the ring is disposed a substantial distance outwardly from the base 35 of the pin groove 25. This space is filled by or contains a yieldable or elastic ring 36, or a spring-like device, that tends to center the lock ring 24 in its pin groove 25. As shown, the pliant elastic ring 36, which may be foam rubber or the like, fills the space between the base 35 of the pin groove and the inner surface 34 of the lock ring when the latter is expanded outwardly. This ring 36 offers resistance to inward collapsing or shifting of the ring 24 within the pin groove 25 and tends to hold it centered therewithin, in addition to adding its spring force to that of the inherent spring force of the lock ring 24 tending to shift it outwardly. When unconfined and disposed within the pin groove 25, the lock ring will not expand fully out of the groove 25, remaining partially therewithin.

In the event it is desired to disconnect the parts of the joint by separating the pin 11 and box 10 from one another, retracting screws 38 can be threaded within circumferentially spaced threaded radial holes 39 in the box 10 opening into its groove 26. By turning the screws in their companion holes 39, they will engage the ring 24 and contract it in an inward direction further into the pin groove 25 and out of the box groove 26, which will then allow the box 10 to be elevated from the pin 11. When the joint is being made up, the screws 38 need not be in place. However, the inner lock ring groove 26 of the box can be filled with a hard grease or similar substance.

When the box 10 is stabbed over the pin 11, the tapered or flaring mouth 18 of the box will engage the upper tapered or cam surface 31 on the ring 24 to first force it inwardly of its groove 25 until the box is disposed fully over the pin, at which time the ring 24 will expand outwardly into the box groove 26 and extrude the grease previously placed within the latter through the threaded holes 39, thereby providing a visual indication that the ring 24 has expanded outwardly into the groove 26 and that the pin and box are locked to one another.

The advantages and use of the connector or tool joint are illustrated in FIGS. 4 to 7. A suitable number of joints of pipe or marine conductor may have been previously connected to one another and disposed in the well bore E underlying the body of water W in which the drilling barge or vessel D is floating. The barge or vessel carries other sections of the marine conductor or pipe.

The lower pipe B remains in a relatively fixed position, whereas, the upper pipe section A having the lower box portion 10 will shift as the ship rolls, moves upwardly and downwardly, or somewhat from side to side. As shown in FIG. 4, the upper pipe section A has been lowered, and despite its misalignment with the lower section B and the upwardly extending pin section 11 of the latter, stabbing of the box 10 over the pin can begin since the entering diameter of its mouth 18 is substantially greater than the diameter of the upper cylindrical portion 13 of the pin. Thus, it is comparatively easy to partially place the lower end of the box 10 over the upper end of the pin 11. The upper section of pipe and its box 10 are gradually lowered, and despite rolling or other movement of the ship, the upper outer edge 40 of the pin, which is preferably rounded, will come into engagement with the tapered wall 20 of the box and will automatically bring the box toward a position of alignment with the pin and lower pipe or conductor section B, as disclosed in FIG. 5.

As shown in FIG. 6, the upper conductor pipe section A and its box 10 have been lowered to a further extent with respect to the upwardly extending pin portion 11 of the lower pipe section B, the upper cylindrical section 13 of the pin being on the point of entering its companion smaller diameter cylindrical section 14 of the box. At this time, the upper end of the lower cylindrical surface 16 of the pin 11 is on the verge of entering the lower larger cylindrical wall or surface 17 of the box. The pin and box are now in a position for establishing final alignment, since they are then fairly close to full alignment.

As lowering of the upper pipe section now continues, the lower inner cylindrical wall or section 17 of the box slides down over its companion lower external cylindrical section 16 of the pin, while at the same time the upper inner cylindrical wall or section 14 of the box is sliding downwardly along the companion upper outer cylindrical surface or section 13 of the pin end, which brings the pin 11 and box 10 into full alignment (FIG. 7), the seal ring 22 moving downwardly over the upper outer cylindrical surface 13 of the pin portion of the joint. During lowering of the upper pipe section A and box 10, the tapering mouth 18 engages the cam surface 31 of the ring and contracts the ring fully inwardly within its groove 25 so that the lower portion of the box can ride past the pin groove 25 until the box groove 26 is in alignment with the latter, whereupon the ring 24 will snap outwardly into the inner groove 26 of the box and complete the coupling of the pin and box portions of the joint to one another and in sealed relation, because of the peripheral sealing action of the elastic seal ring 22 against the outer cylindrical surface 13 of the upper section of the pin (FIG. 2). As noted above, assuming the box groove 26 to have previously been filled with a grease or grease-like material, the inherent outward expansion of the lock ring 24 into the groove 26 will force the grease outwardly through the threaded holes 39, providing a visual indication to the operator that the parts are locked to one another.

As shown in the drawings, the tapered walls 19, 20 of the pin member and box member are of extended length and steeply inclined to their respective axes. Such steep inclination facilitates relative guiding of the box member onto the pin member and the bringing of such parts into an aligned position, while, at the same time, the extended length of the tapered walls results in the outer inner surface 17 of the box member having a much greater diameter than the cylindrical surface 13 of the pin member, allowing the box member to be disposed readily over the pin member despite severe misalignment or inclination of the box member 10 and its associated pipe section A relative to the pin member, such as illustrated in FIG. 5.

The tapered walls 19, 20 are disposed at an angle to the axis of the pin and box members which is steep and actually a self-locking angle. As an example, the angle of taper disclosed in the drawings is less than 10 degrees. Hard steel or mild steel of which the parts are made has a self-locking angle of about 18 or 19 degrees. Despite this self-locking angle, the full disposition of the box member 10 over the pin member 11, as shown in FIG. 2, does not bring the surfaces or walls 19, 20 into wedging engagement with each other, insuring that the pin and box members can be separated from one another, if desired.

As was described above, if, for some reason, the pin 11 and box 10 are to be disconnected from one another, the retracting screws 38 can be threaded into their companion holes 39 and brought to bear against the ring 24 at circumferentially spaced points therealong for the purpose of shifting it fully out of the box locking groove 26, whereupon the box 10 can be elevated, and without rotation, from the pin 11, to disconnect the parts from one another.

The overlapping length of the pin and box members 10, 11 and their longitudinally spaced cylindrical mating surfaces are such that a stiff stable joint structure is provided that firmly secures the upper and lower conductor pipe sections A, B to one another and resists their relative bending action. The stability of the parts and the ease with which the box 10 can be stabbed over the pin section 11, despite rolling or other movements of the ship and reasonable misalignments between the parts, become quite evident when comparatively large diameter tool joints are being made up. As an example, if marine conductor pipe is being run in the well bore of a diameter of approximately 20 inches, and even greater, it is rather difficult to effect a threaded connection between the tool joint parts when they are misaligned, while the pipe sections are relatively rotated to complete the threaded connection. The same is true of connecting the upper and lower sections to one another through a welding operation. It is rather difficult to place and maintain the pipe sections in alignment while the welding operation proceeds around the circumference of the tool joint.

Another advantage of the connector illustrated is that the sealing element 22 is placed within the box member 10 and near its innermost end. This box member is the lower end of each pipe section, and despite the fact that the latter might be dragged along the rig floor, or inadvertently contact other members, the seal ring will not be damaged because of its remote position from the bore end 18, well within the interior of the box.

The connection between the pipe sections A, B can be made in a relatively simple manner merely by stabbing the box portion 10 over the pin portion 11 until the lock ring 24 snaps into its locked position within the box groove 26. It is unnecessary to rotate any pipe section. The only operation necessary is the relative full stabbing of the pin into the box, resulting in a locked joint in which the parts are sealed to one another against leakage by the seal ring 22.

I claim:

1. In a tool joint: a box member; a pin member receivable in said box member; said pin member having a first cylindrical peripheral surface at its outer end section, a second cylindrical peripheral surface of a greater diameter than said first surface spaced longitudinally therefrom, and a third peripheral tapered surface tapering from said second surface to said first surface; said box member having a first inner cylindrical surface at its inner section conforming to said first peripheral surface, a second inner cylindrical surface at its outer end section conforming to said second pheripheral surface, and a third inner tapered surface tapering from said second inner surface to said first inner surface and conforming to said third peripheral tapered surface; said tapered surfaces each being steeply inclined to the respective axes of said pin member and box member at a self-locking angle, said tapered surfaces being substantially longer than said first peripheral cylindrical surface of said pin member and substantially longer than said second inner cylindrical surface of said box member; one of said members having laterally movable lock means thereon; said other of said members having lock receiving means thereon for receiving said lock means upon full reception of said pin member in said box member to lock said members together against relative longitudinal movement with said first, second and third peripheral surfaces within said first, second and third inner surfaces, respectively, the axial length of the first inner cylindrical surface of said box member being less than the axial length of the first peripheral surface of said pin member, whereby said third peripheral surface is rendered free from wedging contact with said third inner surface.

2. In a tool joint: a box member; a pin member receivable in said box member; said pin member having a first cylindrical peripheral surface at its outer end section, a second cylindrical peripheral surface of a greater diameter than said first surface spaced longitudinally therefrom, and a third peripheral tapered surface tapering from said second surface to said first surface; said box member having a first inner cylindrical surface at its inner section conforming to said first peripheral surface, a second inner cylindrical surface at its outer end section conforming to said second peripheral surface, and a third inner tapered surface tapering from said second inner surface to said first inner surface and conforming to said third peripheral tapered surface; said tapered surfaces each being steeply inclined to the respective axes of said pin member and box member at a self-locking angle, said tapered surfaces being substantially longer than said first peripheral cylindrical surface of said pin member and substantially longer than said second inner cylindrical surface of said box member; one of said members having laterally movable lock means thereon; said other of said members having lock receiving means thereon for receiving said lock means upon full reception of said pin member in said box member to lock said members together against relative longitudinal movement with said first, second and third peripheral surfaces within said first, second and third inner surfaces, respectively, the axial length of the first inner cylindrical surface of said box member being less than the axial length of the first peripheral surface of said pin member, whereby said third peripheral surface is rendered free from wedging contact with said third inner surface; said box member having an internal circumferential groove therein opening through said first inner surface; and a seal ring in said groove sealingly engaging said first peripheral surface.

3. In a tool joint: a box member; a pin member receivable in said box member; said pin member having a first cylindrical peripheral surface at its outer end section, a second cylindrical peripheral surface of a greater diameter than said first surface spaced longitudinally therefrom, and a third peripheral tapered surface tapering from said second surface to said first surface; said box member having a first inner cylindrical surface at its inner section conforming to said first peripheral surface, a second inner cylindrical surface at its outer end section conforming to said second peripheral surface, and a third inner tapered surface tapering from said second inner surface to said first inner surface and conforming to said third peripheral tapered surface; said tapered surfaces each being steeply inclined to the respective axes of said pin member and box member at a self-locking angle, said tapered surfaces being substantially longer than said first peripheral cylindrical surface of said pin member and substantially longer than said second inner cylindrical surface of said box member; said box member having an inner circumferential groove opening through said second inner surface; said pin member having an outer circumferential groove opening through said second peripheral surface; and an expandable and contractable lock ring in said outer circumferential groove expandable into said inner groove to lock said members together against longitudinal movement with said first, second and third peripheral surfaces within said first, second and third inner surfaces, respectively, the axial length of the first inner cylindrical surface of said box member being less than the axial length of the first peripheral surface of said pin member, whereby said third peripheral surface is rendered free from wedging contact with said third inner surface.

4. In a tool joint: a box member; a pin member receivable in said box member; said pin member having a first cylindrical peripheral surface at its outer end section, a second cylindrical peripheral surface of a greater diameter than said first surface spaced longitudinally therefrom, and a third peripheral tapered surface tapering from said second surface to said first surface; said box member having a first inner cylindrical surface at its inner section conforming to said first peripheral surface, a second inner cylindrical surface at its outer end section conforming to said second peripheral surface, and a third inner tapered surface tapering from said second inner surface to said first inner surface and conforming to said third peripheral tapered surface; said tapered surfaces each being steeply inclined to the respective axes of said pin member and box member at a self-locking angle, said tapered surfaces being substantially longer than said first peripheral cylindrical surface of said pin member and substantially longer than said second inner cylindrical surface of said box member; said box member having an inner circumferential groove opening through said second inner surface; said pin member having an outer circumferential groove opening through said second peripheral surface; an expandable and contractable lock ring in said outer circumferential groove expandable into said inner groove to lock said members together against longitudinal movement with said first, second and third peripheral surfaces within said first, second and third inner surfaces, respectively, the axial length of the first inner cylindrical surface of said box member being less than the axial length of the first peripheral surface of said pin member, whereby said third peripheral surface is rendered free from wedging contact with said third inner surface; said box member having an internal circumferential seal groove therein opening through said first inner surface; and a seal ring in said seal groove sealingly engaging said first peripheral surface.

5. In a tool joint: a box member; a pin member receivable in said box member; said pin member having a first cylindrical peripheral surface at its outer end section, a second cylindrical peripheral surface of a greater diameter than said first surface spaced longitudinally therefrom, and a third peripheral tapered surface tapering from said second surface to said first surface; said box member having a first inner cylindrical surface at its inner section conforming to said first peripheral surface, a second inner cylindrical surface at its outer end section conforming to said second peripheral surface, and a third inner tapered surface tapering from said second inner surface to said first inner surface and conforming to said third peripheral tapered surface; said tapered surfaces each being steeply inclined to the respective axes of said pin member and box member at a self-locking angle, said tapered surfaces being substantially longer than said first peripheral cylindrical surface of said pin member and substantially longer than said second inner cylindrical surface of said box member; said box member having an inner circumferential groove opening through said second inner surface; said pin member having an outer circumferential groove opening through said second peripheral surface; an expandable and contractable lock ring in said outer circumferential groove expandable into said inner groove to lock said members together against longitudinal movement with said first, second and third peripheral surfaces within said first, second and third inner surfaces, respectively, the axial length of the first inner cylindrical surface of said box member being less than the axial length of the first peripheral surface of said pin member, whereby said third peripheral surface is rendered free from wedging contact with said third inner surface; said box member having an outwardly flaring mouth portion spaced longitudinally from said inner circumferential groove and engageable with said lock ring to retract said lock ring within said outer groove and thereby allow said box member and pin member to move longitudinally relative to each other until said lock ring shifts into said inner groove.

6. In a tool joint: a box member; a pin member receivable in said box member; said pin member having a first cylindrical peripheral surface at its outer end section, a second cylindrical peripheral surface of a greater diameter than said first surface spaced longitudinally therefrom, and a third peripheral tapered surface tapering from said second surface to said first surface; said box member having a first inner cylindrical surface at its inner section conforming to said first peripheral surface, a second inner cylindrical surface at its outer end section conforming to said second peripheral surface, and a third inner tapered surface tapering from said second inner surface to said first inner surface and conforming to said third peripheral tapered surface; said tapered surfaces each being steeply inclined to the respective axes of said pin member and box member at a self-locking angle, said tapered surfaces being substantially longer than said first peripheral cylindrical surface of said pin member and substantially longer than said second inner cylindrical surface of said box member; said box member having an inner circumferential groove opening through said second inner surface; said pin member having an outer circumferential groove opening through said second peripheral surface; an expandable and contractable lock ring in said outer circumferential groove expandable into said inner groove to lock said members together against longitudinal movement with said first, second and third peripheral surfaces within said first, second and third inner surfaces, respectively, the axial length of the first inner cylindrical surface of said box member being less than the axial length of the first peripheral surface of said pin member, whereby said third peripheral surface is rendered free from wedging contact with said third inner surface, and means in said outer groove behind said lock ring yieldingly resisting contraction of said ring in said outer groove.

7. In a tool joint: a box member; a pin member receivable in said box member; said pin member having a first cylindrical peripheral surface at its outer end section, a second cylindrical peripheral surface of a greater diameter than said first surface spaced longitudinally therefrom, and a third peripheral tapered surface tapering from said second surface to said first surface; said box member having a first inner cylindrical surface at its inner section conforming to said first peripheral surface, a second inner cylindrical surface at its outer end section conforming to said second peripheral surface, and a third inner tapered surface tapering from said second inner surface to said first inner surface and conforming to said third peripheral tapered suface; said tapered surfaces each being steeply inclined to the respective axes of said pin member and box member at a self-locking angle, said tapered surfaces being substantially longer than said first peripheral cylindrical surface of said pin member and substantially longer than said second inner cylindrical surface of said box member; said box member having an inner circumferential groove opening through said second inner surface; said pin member having an outer circumferential groove opening through said second peripheral surface; an expandable and contractable lock ring in said outer circumferential groove expandable into said inner groove to lock said members together against longitudinal movement with said first, second and third peripheral surfaces within said first, second and third inner surfaces, respectively, the axial length of the first inner cylindrical surface of said box member being less than the axial length of the first peripheral surface of said pin member, whereby said third peripheral surface is rendered free form wedging contact with said third inner surface; and means on said box member engageable with said lock ring to retract said lock ring from said inner groove.

8. In a tool joint: a box member; a pin member receivable in said box member; said pin member having a first cylindrical peripheral surface at its outer end section, a second cylindrical peripheral surface of a greater diameter than said first surface spaced longitudinally therefrom, and a third peripheral tapered surface tapering from said second surface to said first surface; said box member having a first inner cylindrical surface at its inner section conforming to said first peripheral surface, a second inner cylindrical surface at its outer end section conforming to said second peripheral surface, and a third inner tapered surface tapering from said second inner surface to said first inner surface and conforming to said third peripheral tapered surface; said tapered surfaces each being steeply inclined to the respective axes of said pin member and box member at a self-locking angle, said tapered surfaces being substantially longer than said first peripheral cylindrical surface of said pin member and substantially longer than said second inner cylindrical surface of said box member; said box member having an inner circumferential groove opening through said second inner surface; said pin member having an outer circumferential groove opening through said second peripheral surface; an expandable and contractable lock ring in said outer circumferential groove expandable into said inner groove to lock said members together against longitudinal movement with said first, second and third peripheral surfaces within said first, second and third inner surfaces, respectively, the axial length of the first inner cylindrical surface of said box member being less than the axial length of the first peripheral surface of said pin member, whereby said third peripheral surface is rendered free from wedging contact with said third inner surface; said box member having threaded holes extending from its exterior to said inner groove; and thread means adapted to be threaded within said holes into engagement with said lock ring to retract said lock ring from said inner groove.

9. In a tool joint: a box member; a pin member receivable in said box member; said pin member having a first cylindrical peripheral surface at its outer end section, a second cylindrical peripheral surface of a greater diameter than said first surface spaced longitudinally therefrom, and a third peripheral tapered surface tapering from said second surface to said first surface; said box member having a first inner cylindrical surface at its inner section conforming to said first peripheral surface, a second inner cylindrical surface at its outer end section conforming to said second peripheral surface, and a third inner tapered surface tapering from said second inner surface to said first inner surface and conforming to said third peripheral tapered surface; said tapered surfaces each being steeply inclined to the respective axes of said pin member and box member at a self-locking angle, said tapered surfaces being substantially longer than said first peripheral cylindrical surface of said pin member and substantially longer than said second inner cylindrical surface of said box member; said box member having an inner circumferential groove opening through said second inner surface; said pin member having an outer circumferential groove opening through said second peripheral surface; an expandable and contractable lock ring in said outer circumferential groove expandable into said inner groove to lock said members together against longitudinal movement with said first, second and third peripheral surfaces within said first, second and third inner surfaces, respectively, the axial length of the first inner cylindrical surface of said box member being less than the axial length of the first peripheral surface of said pin member, whereby said third peripheral surface is rendered free from wedging contact with said third inner surface; said box member having an outwardly flaring mouth portion spaced longitudinally from said inner circumferential groove and engageable with said lock ring to retract said lock ring within said outer groove and thereby allow said box member and pin member to move longitudinally relative to each other until said lock ring shifts into said inner groove; means in said outer groove behind said lock ring yieldably resisting contraction of said ring in said outer groove; said box member having threaded holes extending from its exterior to said inner groove; and thread means adapted to be screwed in said holes into engagement with said lock ring to retract said lock ring from said inner groove.

10. In a tool joint: a box member; a pin member receivable in said box member; said pin member having a first cylindrical peripheral surface at its outer end section, a second cylindrical peripheral surface of a greater diameter than said first surface spaced longitudinally therefrom, and a third peripheral tapered surface tapering from said second surface to said first surface; said box member having a first inner cylindrical surface at its inner section conforming to said first peripheral surface, a second inner cylindrical surface at its outer end section conforming to said second peripheral surface, and a third inner tapered surface tapering from said second inner surface to said first inner surface and conforming to said third peripheral tapered surface; said tapered surfaces each being steeply inclined to the respective axes of said pin member and box member at a self-locking angle, said tapered surfaces being substantially longer than said first peripheral cylindrical surface of said pin member and substantially longer than said second inner cylindrical surface of said box member; said box member having an inner circumferential groove opening through said second inner surface; said pin member having an outer circumferential groove opening through said second peripheral surface; and an expandable and contractable lock ring in said outer circumferential groove expandable into said inner groove to lock said members together against longitudinal movement with said first, second and third peripheral surfaces within said first, second and third inner surfaces, respectively, the axial length of the first inner cylindrical surface of said box member being less than the axial length of the first peripheral surface of said pin member, whereby said third peripheral surface is rendered free from wedging contact with said third inner surface; the side of said inner circumferential groove remote from the outer end of said box member being tapered in a direction leading away from said outer end of said box member.

11. In a tool joint: a box member; a pin member receivable in said box member; said pin member having a first cylindrical peripheral surface at its outer end section, a second cylindrical peripheral surface of a greater diameter than said first surface spaced longitudinally therefrom, and a third peripheral tapered surface tapering from said second surface to said first surface; said box member having a first inner cylindrical surface at its inner section conforming to said first peripheral surface, a second inner cylindrical surface at its outer end section conforming to said second peripheral surface, and a third inner tapered surface tapering from said second inner surface to said first inner surface and conforming to said third peripheral tapered surface; said tapered surfaces each being steeply inclined to the respective axes of said pin member and box member at a self-locking angle, said tapered surfaces being substantially longer than said first peripheral cylindrical surface of said pin member and substantially longer than said second inner cylindrical surface of said box member; said box member having an inner circumferential groove opening through said second inner surface; said pin member having an outer circumferential groove opening through said second peripheral surface; an expandable and contractable lock ring in said outer circumferential groove expandable into said inner groove to lock said members together against longitudinal movement with said first, second and third peripheral surfaces within said first, second and third inner surfaces, respectively, the axial length of the first inner cylindrical surface of said box member being less than the axial length of the first peripheral surface of said pin member, whereby said third peripheral surface is rendered free from wedging contact with said third inner surface; said box member having an outwardly flaring mouth portion spaced longitudinally from said inner circumferential groove and engageable with said lock ring to retract said lock ring within said outer groove and thereby allow said box member and pin member to move longitudinally relative to each other until said lock ring shifts into said inner groove; the side of said inner circumferential groove remote from the outer end of said box member being tapered in a direction leading away from said outer end of said box member.

12. In a tool joint: a box member; a pin member receivable in said box member; said pin member having a first cylindrical peripheral surface at its outer end section, a second cylindrical peripheral surface of a greater diameter than said first surface spaced longitudinally therefrom, and a third peripheral tapered surface tapering from said second surface to said first surface; and box member having a first inner cylindrical surface at its inner section conforming to said first peripheral surface, a second inner cylindrical surface at its outer end section conforming to said second peripheral surface, and a third inner tapered surface tapering from said second inner surface to said first inner surface and conforming to said third peripheral tapered surface; said tapered surfaces each being steeply inclined to the respective axes of said pin member and box member at a self-locking angle, said tapered surfaces being substantially longer than said first peripheral cylindrical surface of said pin member and substantially longer than said second inner cylindrical surface of said box member; said box member having an inner circumferential groove opening through said second inner surface; said pin member having an outer circumferential groove opening through said second peripheral surface; an expandable and contractable lock ring in said outer circumferential groove expandable into said inner groove to lock said members together against longitudinal movement with said first, second and third peripheral surfaces within said first, second and third inner surfaces, respectively, the axial length of the first inner cylindrical surface of said box member being less than the axial length of the first peripheral surface of said pin member, whereby said third peripheral surface is rendered free from wedging contact with said third inner surface; said box member having an outwardly flaring mouth portion spaced longitudinally from said inner circumferential groove and engageable with said lock ring to retract said lock ring within said outer groove and thereby allow said box member and pin member to move longitudinally relative to each other until said lock ring shifts into said inner groove; the side of said inner circumferential groove remote from the outer end of said box member being tapered in a direction leading away from said outer end of said box member; means in said outer groove behind said lock ring yieldably resisting contraction of said ring in said outer groove; said box member having threaded holes extending from its exterior to said inner groove; and thread means adapted to be screwed in said holes into engagement with said lock ring to retract said lock ring from said inner groove.

References Cited

UNITED STATES PATENTS

| 1,372,297 | 3/1921 | Kennedy | 285—317 X |
| 2,104,180 | 1/1938 | Barker | 285—141 |
| 2,238,706 | 4/1941 | Ohls | 285—317 X |
| 2,476,172 | 7/1949 | Williams | 285—317 X |

FOREIGN PATENTS

| 1,305,096 | 8/1962 | France. |
| 703,339 | 5/1955 | Great Britain. |

CARL W. TOMLIN, *Primary Examiner.*

R. G. BERKLEY, *Examiner.*